(12) United States Patent
Yetukuri et al.

(10) Patent No.: US 7,556,306 B2
(45) Date of Patent: *Jul. 7, 2009

(54) SYSTEM AND METHOD FOR ACTUATION OF A HEAD RESTRAINT

(75) Inventors: Arjun Yetukuri, Rochester Hills, MI (US); David Hein, Sterling Heights, MI (US); Sai Prasad Jammalamadaka, Novi, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/601,940

(22) Filed: Nov. 20, 2006

(65) Prior Publication Data

US 2007/0114810 A1    May 24, 2007

Related U.S. Application Data

(63) Continuation-in-part of application No. 11/164,384, filed on Nov. 21, 2005.

(60) Provisional application No. 60/836,221, filed on Aug. 7, 2006.

(51) Int. Cl.
*B60N 2/48* (2006.01)
(52) U.S. Cl. .................. 296/63; 296/68.1; 297/408; 297/410
(58) Field of Classification Search ............ 296/63–69, 296/1.11; 297/408, 410
See application file for complete search history.

(56) References Cited

U.S. PATENT DOCUMENTS

| | | | |
|---|---|---|---|
| 2,985,229 A | 5/1961 | Shamblin | |
| 4,645,233 A | 2/1987 | Bruse et al. | |
| 4,711,494 A | 12/1987 | Duvenkamp | |
| 4,807,034 A | 2/1989 | Takeuchi et al. | |
| 4,977,973 A | 12/1990 | Takizawa | |
| 5,003,240 A * | 3/1991 | Ikeda | 318/603 |
| 5,006,771 A * | 4/1991 | Ogasawara | 318/568.1 |
| 5,208,514 A | 5/1993 | Bassick | |

(Continued)

FOREIGN PATENT DOCUMENTS

DE    3440525 A1    5/1986

(Continued)

OTHER PUBLICATIONS

Machine translation from esp@cenet translations of DE19933769. Abstract from Derwent.*

(Continued)

*Primary Examiner*—Dennis H Pedder
(74) *Attorney, Agent, or Firm*—Brooks Kushman P.C.

(57) ABSTRACT

A system and method for remote actuation of a vehicle head restraint includes an actuator arrangement configured to effect movement of a head restraint from a raised position to a lowered position. A sensor defines a first area, and is configured to output signals to the actuator arrangement to facilitate movement of the head restraint from its raised position to its lowered position when an object comes within a predetermined distance of the first area. The sensor is disposed proximate a rearview mirror in the vehicle such that a user can simultaneously view the head restraint in the mirror and the first area. Remote actuation systems using infrared sensor assemblies such infrared proximity sensors are disclosed.

17 Claims, 5 Drawing Sheets

U.S. PATENT DOCUMENTS

| | | | |
|---|---|---|---|
| 5,288,129 A * | 2/1994 | Nemoto | 297/410 |
| 5,322,245 A | 6/1994 | Bassick | |
| 5,484,189 A | 1/1996 | Patterson | |
| 5,590,933 A | 1/1997 | Andersson | |
| 6,074,011 A * | 6/2000 | Ptak et al. | 297/408 |
| 6,088,640 A * | 7/2000 | Breed | 701/45 |
| 6,614,579 B2 * | 9/2003 | Roberts et al. | 359/267 |
| 6,629,575 B2 | 10/2003 | Nikolov | |
| 6,824,212 B2 * | 11/2004 | Malsch et al. | 297/216.12 |
| 6,902,232 B2 | 6/2005 | Kamrath et al. | |
| 6,908,151 B2 | 6/2005 | Meeker et al. | |
| 6,910,740 B2 | 6/2005 | Baker et al. | |
| 7,196,836 B2 * | 3/2007 | Bauer et al. | 359/265 |
| 7,232,187 B1 * | 6/2007 | Sundararajan et al. | 297/410 |
| 2002/0147535 A1 | 10/2002 | Nikolov | |
| 2004/0124677 A1 | 7/2004 | Meeker | |
| 2004/0189068 A1 | 9/2004 | Meeker | |
| 2005/0067874 A1 | 3/2005 | Kamrath | |
| 2005/0270620 A1 * | 12/2005 | Bauer et al. | 359/265 |

FOREIGN PATENT DOCUMENTS

| | | | |
|---|---|---|---|
| DE | 3638261 A1 | 6/1987 | |
| DE | 4433601 C1 | 4/1996 | |
| DE | 19519619 | * | 12/1996 |
| DE | 198 10 347 A1 | 9/1998 | |
| DE | 19933769 A1 | 1/2001 | |
| EP | 0 688 695 A1 | 12/1995 | |
| EP | 0 756 964 A2 | 2/1997 | |
| EP | 1 138 548 A1 | 10/2001 | |
| GB | 2320426 A | 6/1998 | |
| GB | 2 424 827 A | 10/2006 | |
| WO | 01/38135 A1 | 5/2001 | |
| WO | 2005/075241 A1 | 8/2005 | |

OTHER PUBLICATIONS

Machine translation from esp@cenet translations of DE19519619.
Abstract from Derwent.*
Machine translation from Yahoo! Babel Fish of German Patent Office Action dated Nov. 19, 2008.*
Search Report, dated Mar. 16, 2007, 2 pages.
German Patent Office Action dated Nov. 19, 2008.

* cited by examiner

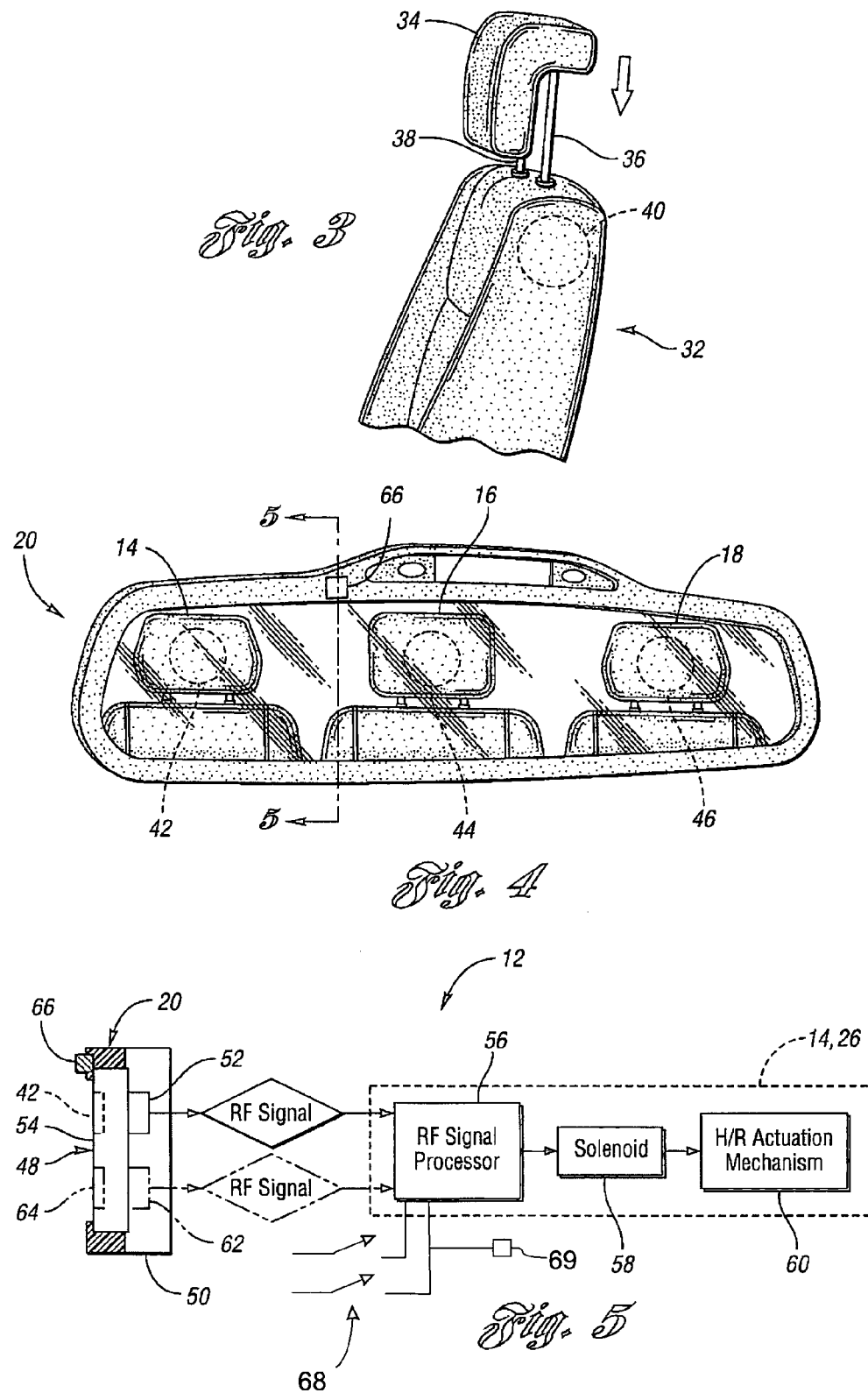

SYSTEM AND METHOD FOR ACTUATION OF A HEAD RESTRAINT

CROSS-REFERENCE TO RELATED APPLICATIONS

This application is a continuation-in-part of U.S. patent application Ser. No. 11/164,384 filed Nov. 21, 2005, and also claims the benefit of U.S. Provisional Application Ser. No. 60/836,221 filed Aug. 7, 2006, the entire disclosures of these applications are hereby incorporated by reference.

BACKGROUND OF THE INVENTION

1. Field of the Invention

The present invention relates to a system and method for actuation of a head restraint, and in particular, the present invention relates to a system and method for actuation of a head restraint using an infrared proximity detector.

2. Background Art

In many vehicles today, head restraints are provided not just for the front row passengers, but are also provided for passengers sitting in second and third row seats. When a second or third row seat is unoccupied, it may be desirable to have the associated head restraint folded down, or otherwise lowered, to reduce obstructions to the driver's view through the rear window. Passengers in a third row of seats may also prefer to have one or more head restraints in the second row lowered to improve their forward view.

Previous attempts at providing folding head restraints require either manual actuation of the head restraint—which precludes the driver from folding down the head restraint while operating the vehicle—or remote actuation of all of the head restraints in the rear seats. This may be inconvenient, particularly if one or more of the rear seats is occupied. In addition, the remotely located switch used to actuate the rear head restraints may not be located in a convenient position. For example, if such a switch is located on the vehicle dashboard or center console, the driver may look in the rearview mirror, determine that at least one of the rear head restraints needs to be lowered, and then seek the switch on the dashboard to fold the head restraints. Such a system is somewhat self-defeating, since the goal is to improve rearward visibility, and yet the system requires that the driver look forward at the dashboard to find the actuating switch.

Therefore, it would be desirable to have a system and method for remote head restraint actuation, where the actuating sensors are visible to the driver while the driver is looking in the rearview mirror. In addition, it would also be desirable to have a system and method for remote head restraint actuation that allows for selective, independent actuation of individual head restraints.

SUMMARY OF THE INVENTION

In embodiments of the present invention, a system and method for remote head restraint actuation wherein individual head restraints can be selectively, independently actuated as desired are provided.

In other embodiments of the present invention, a system and method for remote head restraint actuation that includes individual sensors to actuate each head restraint, wherein active areas of each of the sensors are visible to the vehicle driver while the driver is looking in the rearview mirror are provided.

One embodiment of the present invention provides a system for remote actuation of at least one vehicle head restraint movable from a respective raised position to a respective lowered position. The vehicle includes a rearview mirror, and the system includes a first head restraint and a first actuator arrangement. The first actuator arrangement is configured to effect movement of the first head restraint from its raised position to its lowered position. A first sensor defines a first area, and is configured to output signals to the first actuator arrangement to facilitate movement of the first head restraint from its raised position to its lowered position when an object comes within a predetermined distance of the first area. The first sensor is disposed such that a user (e.g., a vehicle operator) can simultaneously view the first head restraint in the mirror while activating the first sensor.

In another embodiment of the invention, the system for remote actuation is as set forth above with first sensor proximate to the mirror such that a user can simultaneously view the first head restraint in the mirror and the first area.

In still another embodiment of the invention, a system for remote actuation of a plurality of vehicle head restraints which are movable from a respective raised position to a respective lowered position is provided. The vehicle includes a rearview mirror, and the system includes a plurality of head restraints visible in the mirror to a vehicle operator. Each of a plurality of actuator arrangements is configured to effect movement of a respective head restraint from its raised position to its lowered position. A plurality of sensors is configured to be independently actuated by a user (e.g., the vehicle operator). Each of the senors is associated with a respective head restraint such that actuation of any one of the sensors effects actuation of a respective actuator arrangement. This facilitates movement of a respective head restraint from its raised position to its lowered position independently from the movement of any of the other head restraints. Each of the sensors defines a respective sensor area, and is disposed proximate the mirror such that the user can simultaneously view the head restraints in the mirror and the sensor areas.

In yet another embodiment of the present invention, a method for remote actuation of at least one vehicle head restraint from a respective raised position to a respective lowered position is provided. The vehicle includes a sensor and an actuator arrangement for each of the at least one head restraints to facilitate movement of a respective head restraint from its raised position to its lowered position. The vehicle further includes a rearview mirror, and the method includes viewing an image of a first head restraint at a first location in the mirror. An object is disposed within a predetermined distance of the first location to actuate a first one of the sensors. This sends a signal from the first sensor to a first one of the actuator arrangements to effect movement of the first head restraint from its raised position to its lowered position.

BRIEF DESCRIPTION OF THE DRAWINGS

FIG. 3 is a perspective view of a portion of a vehicle seat having an alternatively configured head restraint;

FIG. 4 is a perspective view of the vehicle rearview mirror shown in FIG. 1, including images of the head restraints reflected therein;

FIG. 5 is a partially schematic representation of the system shown in FIG. 1;

DETAILED DESCRIPTION OF THE PREFERRED EMBODIMENT(S)

Figure 1:
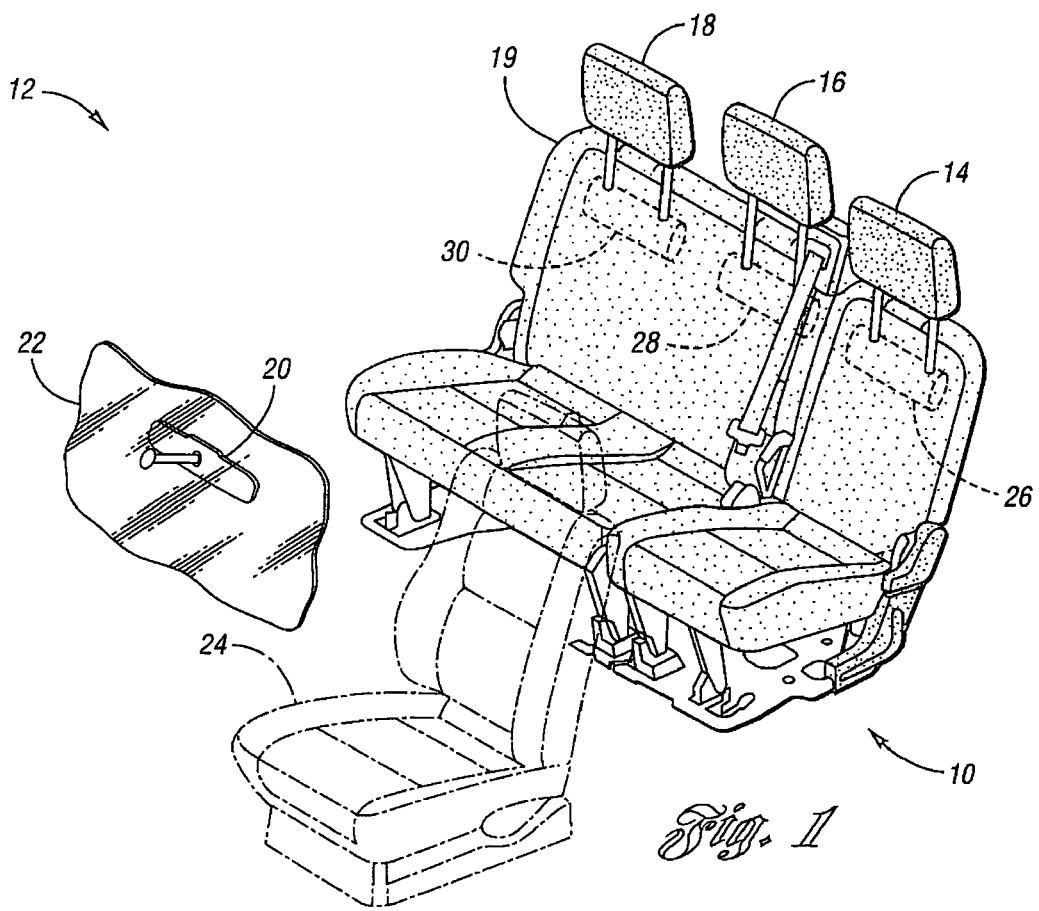
FIG. 1 is a perspective view of a system in accordance with one embodiment of the present invention, including a rear row of vehicle seats having a plurality of head restraints.

FIG. 1 shows a vehicle 10 and a system 12 in accordance with one embodiment of the present invention. The system 12 includes a plurality of head restraints 14, 16, 18, associated with a rear row of seats 19 in the vehicle 10. Although the terms "head restraint" and "head rest" may have technically different meanings within the automotive industry, it is understood that the term "head restraints" as used herein and throughout is intended to include either or both of these devices. Each of the head restraints 14, 16, 18 can be seen by a vehicle operator looking in a rearview mirror 20. In FIG. 1, the rearview mirror 20 is shown attached to a portion of the windshield 22. Also, shown in phantom, is a driver's seat 24.

Figure 2:
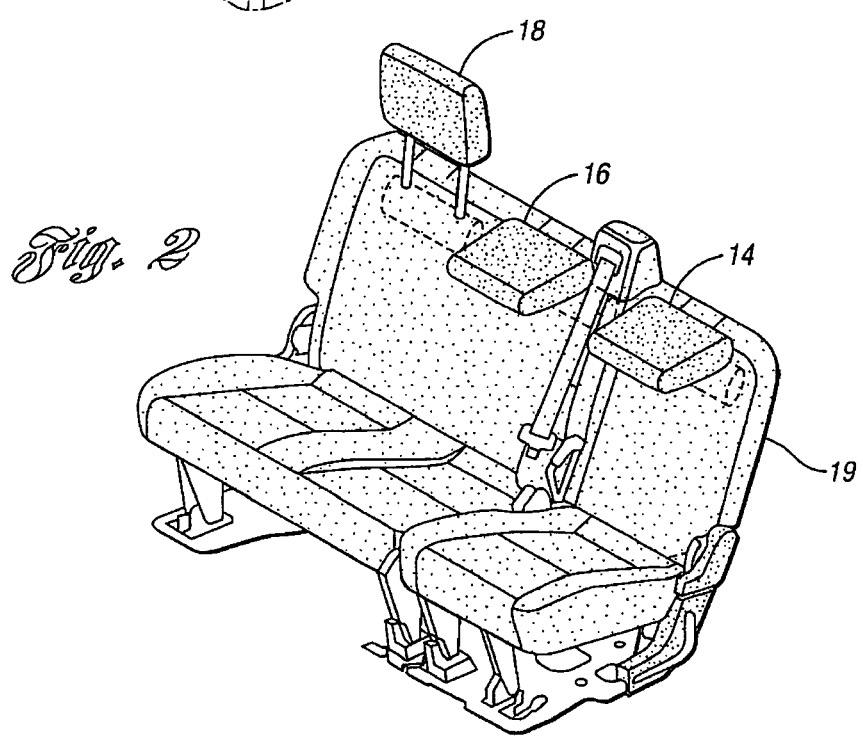
FIG. 2 is a perspective view of the seats shown in FIG. 1, having two of three head restraints folded down to a lowered position.

Each of the head restraints 14, 16, 18 has a respective actuator arrangement 26, 28, 30 associated with it. The actuator arrangements 26, 28, 30 may contain one or more motors, solenoids, gears, springs, cables and the like, effective to move its respective head restraint 14, 16, 18 from a raised position, as shown in FIG. 1, to a lowered position, as shown in FIG. 2 and described below. One type of actuator arrangement effective to move a head restraint, like the head restraints 14, 16, 18, from a raised position to a lowered position, is described in U.S. Pat. No. 5,590,933 issued to Andersson on Jan. 7, 1997, which is hereby incorporated herein by reference.

As shown in FIG. 2, the first and second head restraints, 14, 16 are in a folded down, or lowered position. Conversely, the third head restraint 18 still remains in its raised position. The present invention contemplates individual actuation of each of the head restraints 14, 16, 18, although embodiments of the present invention may lower all rear head restraints, or other groups of head restraints, simultaneously. In addition to providing remote actuation of head restraints in a second row of seats, such as the head restraints 14, 16, 18 in the second row of seats 19, embodiments of the present invention may provide for actuation of head restraints in a third row of seats (not shown). In some vehicles, a front passenger seat may also have a head restraint visible in the rearview mirror to a vehicle operator. In such a case, the present invention can be configured to also provide for remote actuation of a head restraint in the front passenger seat.

When the head restraints 14, 16, 18 are in their respective lowered position, they are folded forward toward the front of the vehicle 10, rather than rearward. This provides a safety feature in that a subsequent occupant of the second row of seats 19 will either have a head restraint in its upright use position, like the head restraint 18, or the head restraint will be folded forward, making it difficult to occupy the seat. In this case, the passenger will need to manually return the head restraint to its raised position, prior to occupying the seat. In this way, it can be ensured that the head restraint will be available if it is needed.

Conversely, if a head restraint is folded rearward, it may be inadvertently left in this position, and therefore not in an upright, use position when the seat is subsequently occupied. Of course, a head restraint need not be folded forward to be placed in a lowered position, and yet, may still be available for use. For example, FIG. 3 shows a portion of a vehicle seat 32 including a head restraint 34. The head restraint 34 is vertically movable on rods 36, 38 and may be moved to a lowered position as indicated by the directional arrow. In such a case, the driver's view may be freed from obstruction, while the head restraint 34 nonetheless can be made available to a subsequent occupier of the seat 32. As with the head restraints 14, 16, 18, the head restraint 34 can be moved to its lowered position by an actuator arrangement 40.

Turning to FIG. 4, the mirror 20 is shown with a visible image of the head restraints 14, 16, 18 reflected therein. For each of the head restraint images reflected in the mirror 20, there is a corresponding area, or head restraint location 42, 44, 46. The head restraint locations 42, 44, 46 are shown in dashed lines in FIG. 4, because they will not be visible to the vehicle operator. They are merely illustrated in FIG. 4 to indicate a location, and in particular, a location associated with a respective sensor that facilitates movement of a respective one of the head restraints 14, 16, 18 from its raised position to its lowered position. For example, FIG. 5 shows a cross-sectional view of the mirror 20 taken through line 5-5 shown in FIG. 4. The area, or head restraint location 42, is indicated by the dashed line shown in the glass 48 of the mirror 20.

The glass 48 is held by a frame 50 which also surrounds a first sensor 52. The sensor 52 is a capacitance-type field effect sensor well known to those in the relevant art. The sensor 52 defines the head restraint location 42, which is an area mapped to the location of the image of the head restraint 14 shown in the mirror 20. The area 42 is used to actuate the sensor 52 to facilitate movement of the head restraint 14 to its lowered position. Although a capacitance-type sensor is shown and described here for illustrative purposes, it is understood that other types of contact or non-contact sensors could be used, including resistive or inductive switches, sound or voice activated switches, infrared sensors, magnetic sensors, or Hall Effect devices. Where a push button contact switch or switches are used, the "area", such as the area 42, could be the face or front surface of the push button.

The sensor 52 can be configured to change the size of the area 42 which can be used to actuate the sensor 52. For example, depending on the circuitry used in the sensor 52, one or more resistors can be changed to increase or decrease the size of the area 42. To actuate the sensor 52, it is only necessary to bring an electrically conductive object—such as a finger—within a predetermined distance of the head restraint location 42. It is worth noting that this predetermined distance can be positive or negative. That is, the sensor 52 can be configured such that the presence of a finger or other object within a few millimeters of a front surface 54 of the mirror glass 48 will actuate the sensor 52. Conversely, the sensor 52 can be configured such that an object must touch, or even deflect the surface 54 inward in order to actuate the sensor 52.

In the variation when capacitance-type sensors are used, once an electrically conductive object is brought within the predetermined distance of the surface 54 within the area 42, the sensor 52 is actuated. As shown in FIG. 5, the sensor 52 is configured for wireless communication with the head restraint 14. In other embodiments, sensors, such as the sensor 52, can communicate with a respective head restraint via a wired system. In the embodiment shown in FIG. 5, the sensor 52 outputs a radio frequency (RF) signal which communicates with an RF signal processor 56. It is understood that other forms of wireless communication may also be used. The RF signal processor 56 then communicates with a solenoid 58 which effects movement of a head restraint actuation mechanism 60. This causes the head restraint 14 to be moved from its raised position—as shown in FIG. 1—to its lowered position—as shown in FIG. 2. Optionally, system 12 includes a user feedback device that provides an indication that the user is about to actuate movement of a headrest (i.e., acknowledgment that the finger is present). A short delay may be provided by the feedback device allowing the user to decide if they still want to actuate the feature, followed by a confirmation feedback indicating that the user has activated the feature. Advantageously, a short tone or beep or the turning on of a light or a vibration can be used for this purpose.

As shown in FIG. 5, the RF signal processor 56, the solenoid 58, and the head restraint actuation mechanism 60 are grouped together and are associated with the head restraint 14 and the actuator mechanism 26. This grouping is for illustrative purposes only, and does not necessarily reflect how an actuator arrangement, such as the actuator arrangement 26, will be configured. For example, the solenoid 58 and the head restraint actuation mechanism 60, may make up, or be part of, the actuator arrangement 26, as shown in FIG. 1. Further, although each head restraint and/or actuator arrangement may have its own signal processor, such as the signal processor 56, a single signal processor could be used to service more than one actuator arrangement and head restraint. A signal processor, such as the signal processor 56, can be disposed in virtually any convenient location throughout a vehicle—e.g., in a mirror, a dashboard, or even in a head restraint assembly, where it could nonetheless send signals to actuate other head restraints in the vehicle.

To illustrate, FIG. 5 shows in phantom a sensor 62 defining an area, or head restraint location 64, in the mirror 20. The sensor 62 could be configured to actuate a head restraint in a third row of seats (not shown) whose image in the mirror 20 would appear near the image of the head restraints 14, 16, 18 from the second row of seats 19. As shown in FIG. 5, actuation of the sensor 62 by bringing an object within the predetermined distance from the head restraint location 64 would cause an RF signal to be output to the RF signals processor 56. The RF signal processor 56 can be configured to receive signals from more than one sensor, and then output signals of different frequencies to actuate the appropriate solenoid and/or other actuator arrangement device. Returning briefly to FIG. 4, it is readily understood that the head restraint locations 44, 46 will each have a sensor associated with them in defining their respective areas in the mirror 20. These sensors would be at approximately the same height as the sensor 52, shown in FIG. 5, and are not visible in this view.

Also shown in FIGS. 4 and 5 is a switch 66 disposed partially within the frame 50 of the mirror 20. Because the sensor 52, and the sensors associated with the other head restraints, may be capacitance-type sensors, it may be desirable to disable the remote actuation feature to allow, for example, the mirror 20 to be adjusted without inadvertently lowering one or more of the head restraints. Thus, the switch 66 can be configured with a first setting which facilitates actuation of sensors, such as the sensors 52 and 62, and it can also have a second setting to prohibit actuation of sensors, such as the sensors 52, 62. The switch 66 can also be configured such that it automatically returns to the second setting to prohibit actuation of the sensors 52, 62 after it has been in the first setting for some predetermined amount of time.

Although it may be convenient to provide sensors, such as the sensors 52, 62 within the frame 50 of the mirror 20, such sensors could be placed in other locations. For example, capacitance-type sensors, or other types of sensors, including switches, could be located within the frame 50 of the mirror 20, or in a location on an upper console or headliner of the vehicle. In such cases, the portions of the sensors that a user would actuate—e.g., the area 42 for the sensor 52—would be visible to the user simultaneously with the reflected image of the head restraints in the mirror 20. In this way, the user does not need to take his or her eyes off of the rearview mirror 20 to search for a button or other actuating mechanism on a dashboard or lower console. Even the switch 66 is conveniently located in the frame 50 of the mirror 20, so that the user can actuate it while still looking in the mirror 20. In other embodiments of the present invention, a switch, such as the switch 66, may be located in other parts of the vehicle, for example, in a steering wheel.

Still referring to FIG. 5, it is also advantageous that actuating mechanism 26 be disabled when an occupant is in a seat. Therefore, actuating mechanism 26 optionally includes vehicle seat occupant sensor 68 that senses the presence of an occupant in a first seat that includes the first heat restraint so that the first head restraint is not movable from the raised to the lowered positions. Optionally, actuating mechanism 26 also includes occupant sensor disabling switch 69 which allows items to be placed on a seat with actuation of a head restraint not being disabled. In yet another refinement, optionally, actuating mechanism 26 includes a user feedback device that provides an indication that the user is about to actuate movement of a headrest (i.e., acknowledgment that the finger is present). A short delay may be provided by the feedback device allowing the user to decide if they still want to actuate the feature, followed by a confirmation feedback indicating that the user has activated the feature. Advantageously, a short tone or beep or the turning on of a light or a vibration can be used for this purpose. In yet another refinement, if two or more sensors are simultaneously touched the function of the sensors is disabled.

The system 12 illustrated in the drawing figures and described above, facilitates the use of a method of remote actuation of a head restraint in accordance with the present invention. With reference to the elements of the drawing figures, a user would view an image of a head restraint, such as the head restraint 14, in the rearview mirror 20. In order to facilitate movement of the head restraint 14 to its lowered position—see FIG. 2—the user would then place an object, such as his or her finger, within a predetermined distance of the area 42 on the mirror 20—see FIG. 4. This would cause the head restraint 14 to be moved to its lowered position. If this did not increase visibility enough, the user could then similarly actuate a sensor to lower the head restraint 16 and/or the head restraint 18. As discussed above, it may be necessary for the user to place the switch 66 into a first setting prior to actuating the desired sensors.

Figure 6:
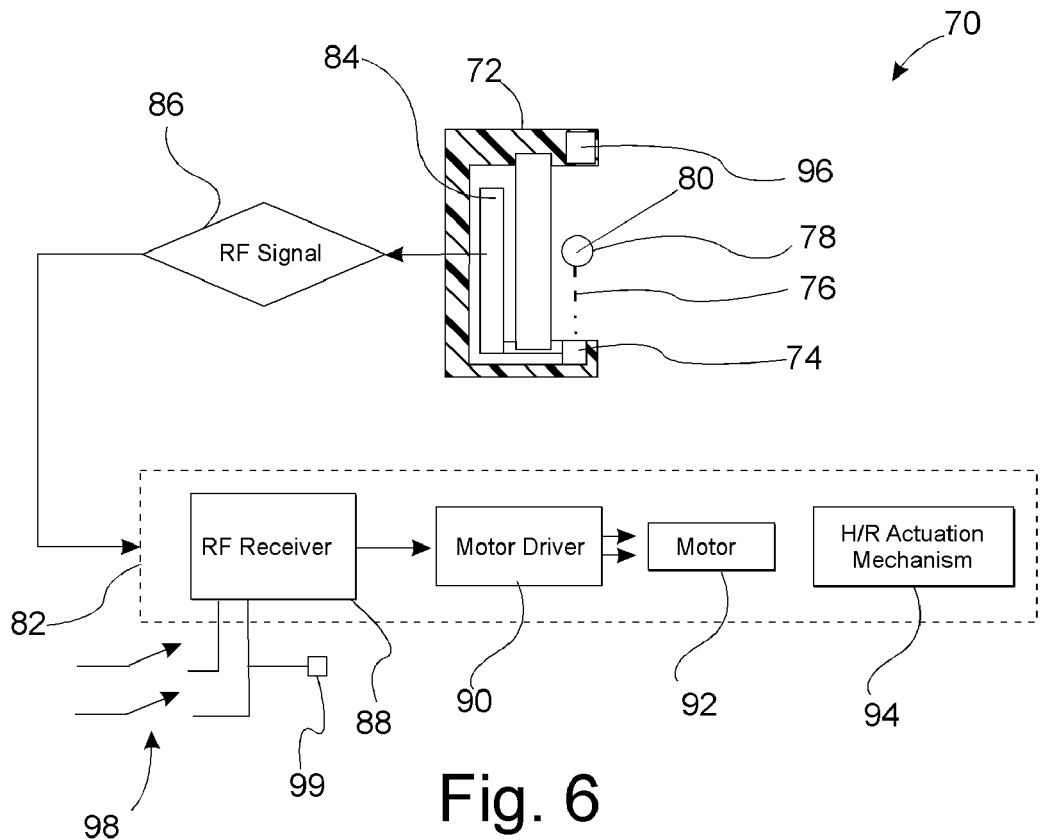
FIG. 6 is a partially schematic representation of a system using infrared proximity detectors.

FIG. 6 shows a cross-sectional view of a mirror using an infrared sensor assembly to facilitate movement of a respective one of the head restraints 14, 16, 18. Remote actuation system 70 includes rearview mirror 72 which in turn includes first infrared sensor assembly 74 which uses an infrared beam 76 to sense the presence of object 78 at predetermined location 80 to initiate actuation of a first vehicle head restraint from a respective raised position to a respective lowered position (or from a lowered to a raised position). First infrared sensor assembly 74 having an infrared emitter and an infrared detector.

In the refinement depicted in FIG. 6, the infrared emitter and the infrared detector are positioned proximate to each other. In another refinement, the infrared emitter and the infrared detector are positioned at different positions proximate to the mirror. First infrared sensor assembly 74 is configured to define a first target area. Moreover, first infrared sensor assembly 74 is also configured to output signals to first actuator arrangement 82 to facilitate movement of the first head restraint from its raised position to its lowered position when object 78 comes within a predetermined distance of the first target area. Advantageously, a wireless transmitter is utilized to direct output signals to first actuator arrangement 82. In one variation, first infrared sensor assembly 74 includes radio frequency transmitter 84 which sends RF signal 86 to RF receiver 88 located in first actuator arrangement 82. Upon receiving an RF signal that indicates actuation is to proceed, motor driver 90 drives motor 92 which then activates the headrest actuator mechanism 94. Alternatively, the actuation mechanism set forth above in connection with the description of FIG. 5 may be used. Remote actuation system 70 optionally includes toggle switch 96 that reverses actuated movement of the first head restraint such that when object 78 comes within a predetermined distance of the first target area such that the headrest is moved from the lowered to the upright position when actuation occurs. In further refinement, object 78 must be present in the first target area for a predetermined time period (e.g., at least 3 seconds) before actuation proceeds. This temporal requirement helps to minimize accidental actuation due to inadvertent contact with the first target area. In a variation as set forth above, first infrared sensor assembly 74 is disposed proximate to rearview mirror 72 such that a user can simultaneously view the first head restraint in the mirror and the first area. Alternatively, remote actuation system 70 further comprises a sensor that disables movement of the first head restraint when a user adjusts the rearview mirror. It is also advantageous that remote actuation system 70 be disabled when an occupant is in a seat. Therefore, remote actuation system 70 optionally includes vehicle seat occupant sensor 98 that senses the presence of an occupant in a first seat that includes the first head restraint so that the first head restraint is not movable from the raised to the lowered positions. Optionally, remote actuation system 70 also includes occupant sensor disabling switch 99 which allows items to be placed on a seat with actuation of a head restraint not being disabled. In yet another refinement, optionally, system 70 includes a user feedback device that provides an indication that the user is about to actuate movement of a headrest (i.e., acknowledgment that the finger is present). A short delay may be provided by the feedback device allowing the user to decide if they still want to actuate the feature, followed by a confirmation feedback indicating that the user has activated the feature. Advantageously, a short tone or beep or the turning on of a light or a vibration can be used for this purpose. In yet another refinement, if two or more sensors are simultaneously touched the function of the sensors is disabled.

It should be appreciated that the present embodiment is not limited to the mounting of an infrared sensor assembly proximate to a mirror. The present embodiment includes variations in which an infrared sensor assembly is mounted to any component or structure in a vehicle interior that is accessible to a vehicle occupant. Examples of other structures include, but are not limited to, the vehicle dashboard, an armrest, a console, a side panel, a sun visor, the vehicle ceiling, or even in a head restraint assembly, where it could nonetheless send signals to actuate other head restraints in the vehicle.

Figure 7:
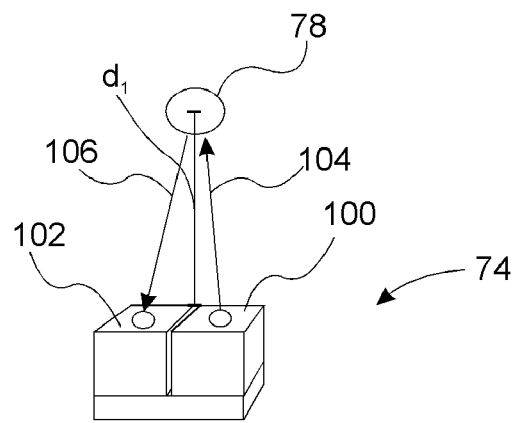
FIG. 7 is a partially schematic representation of a system using infrared proximity detectors.

FIG. 7 provides a perspective view of a variation of first infrared sensor assembly 72 in which first infrared assembly is an infrared proximity sensor. In this variation, first infrared sensor assembly 74 includes infrared emitter 100 mounted proximate to infrared detector 102. In this variation, the location of object 78 may be determined by triangulation when object 78 interrupts emitted infrared beam 104 from emitter 100 thereby reflecting portion 106 of emitted infrared beam 104. Advantageously, infrared proximity sensors are able to detect object 78 at various distances $d_1$ from infrared sensor assembly 74 outputting a signal that allows determination of distance $d_1$. This feature allows a single sensor assembly to detect the presence of an object in more than one target area thereby allowing the defining of one or more target areas.

Figure 8A:
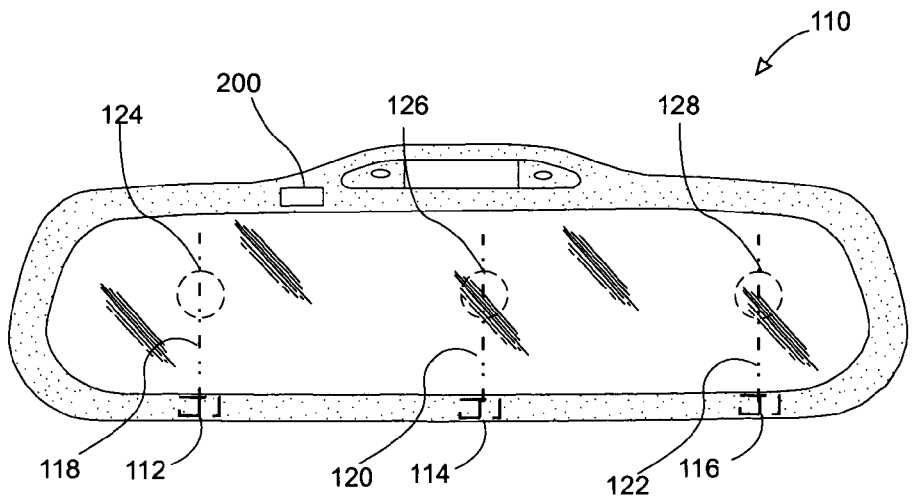
FIG. 8A is a front view of a rearview mirror which includes infrared proximity detectors that emit infrared beams in a vertical direction.
Figure 8B:
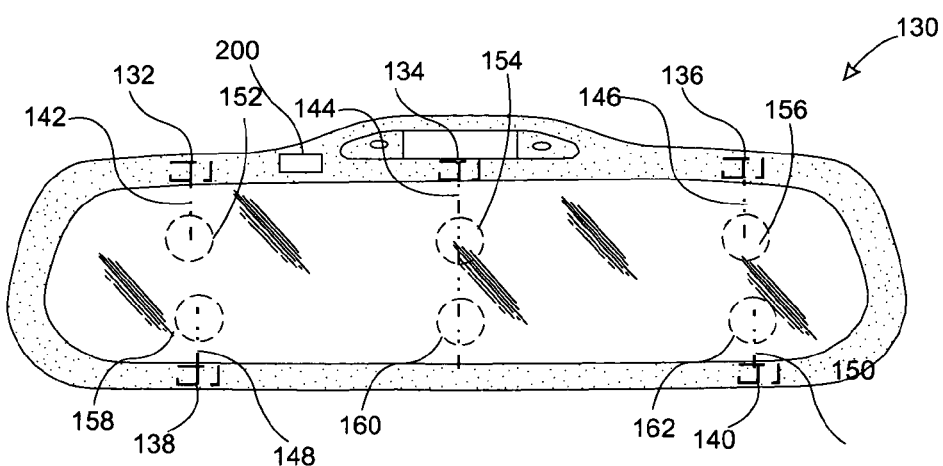
FIG. 8B is a front view of another rearview mirror which includes infrared proximity detectors that emit infrared beams in a substantially vertical direction.
Figure 8C:
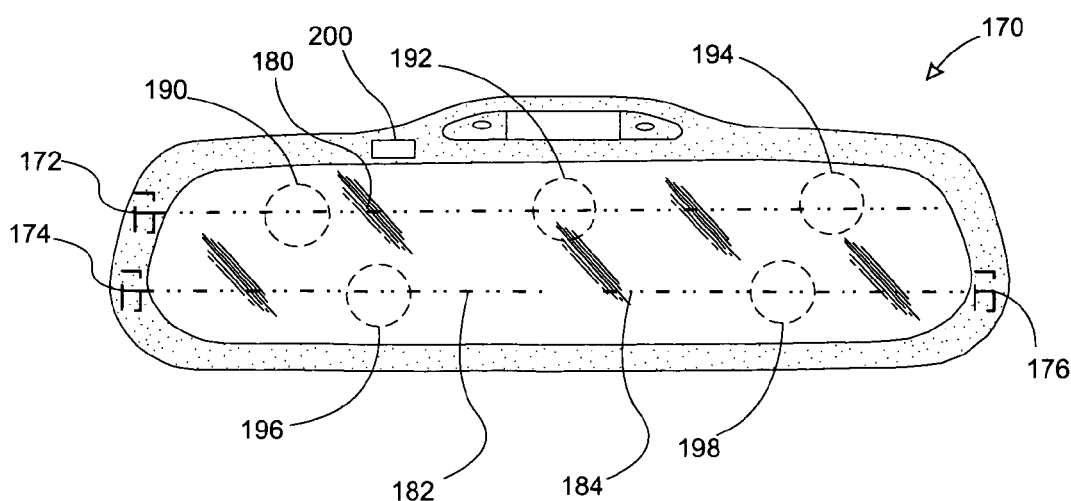
FIG. 8C is a front view of a rearview mirror which includes infrared proximity detectors that emit infrared beams in a substantially horizontal direction.

FIGS. 8A, 8B, and 8C provide schematic illustrations of a rearview mirror having several sensor assemblies positioned at different positions proximate to a side of a rearview mirror. FIG. 8A shows rearview mirror 110 that includes infrared proximity detectors 112, 114, 116 which respectively emit infrared beams 118, 120, 122 in a vertical direction. In this variation, actuating system 70 is configured to define target areas 124, 126, 128 each of which is related to a headrest that is actuated when an object is present within one of target areas 124, 126, 128. In the variation of FIG. 8A, actuating system 70 is such that infrared beams 118, 120, 122 each define a single target area. FIG. 8B shows rearview mirror 130 that includes infrared proximity detectors 132-140 which respectively emit infrared beams 142-150 in a substantially vertical direction. In this variation, actuating system 70 is configured to define target areas 152-162 each of which is related to a headrest that is actuated when an object is present within one of target areas 152-162. FIG. 8C shows rearview mirror 170 that includes infrared proximity detectors 172-176 which respectively emit infrared beams 180, 182, 184 in a substantially horizontal direction. In this variation, actuating system 70 is configured to define target areas 190-198 each of which is related to a headrest that is actuated when an object is present within one of target areas 190-198. In this variation, sensor 172 defines target areas 190, 192, 194.

As illustrated in FIGS. 8A, 8B, and 8C, actuation system 70 includes optional switch 200 which has a first setting for facilitating actuation of the first and second sensors, and a second setting for prohibiting actuation of the first and second sensors. In this context, switch 200 is used to confirm the desire of the user to actuate a head restraint. For example, a user selects a head restraint to actuate as set forth above. If the user really desires actuation, switch 200 is operated. In a refinement, switch 200 is disposed proximate the mirror such that the user can simultaneously view the first and second head restraints in the mirror, the first and second areas, and the switch.

Figure 9:
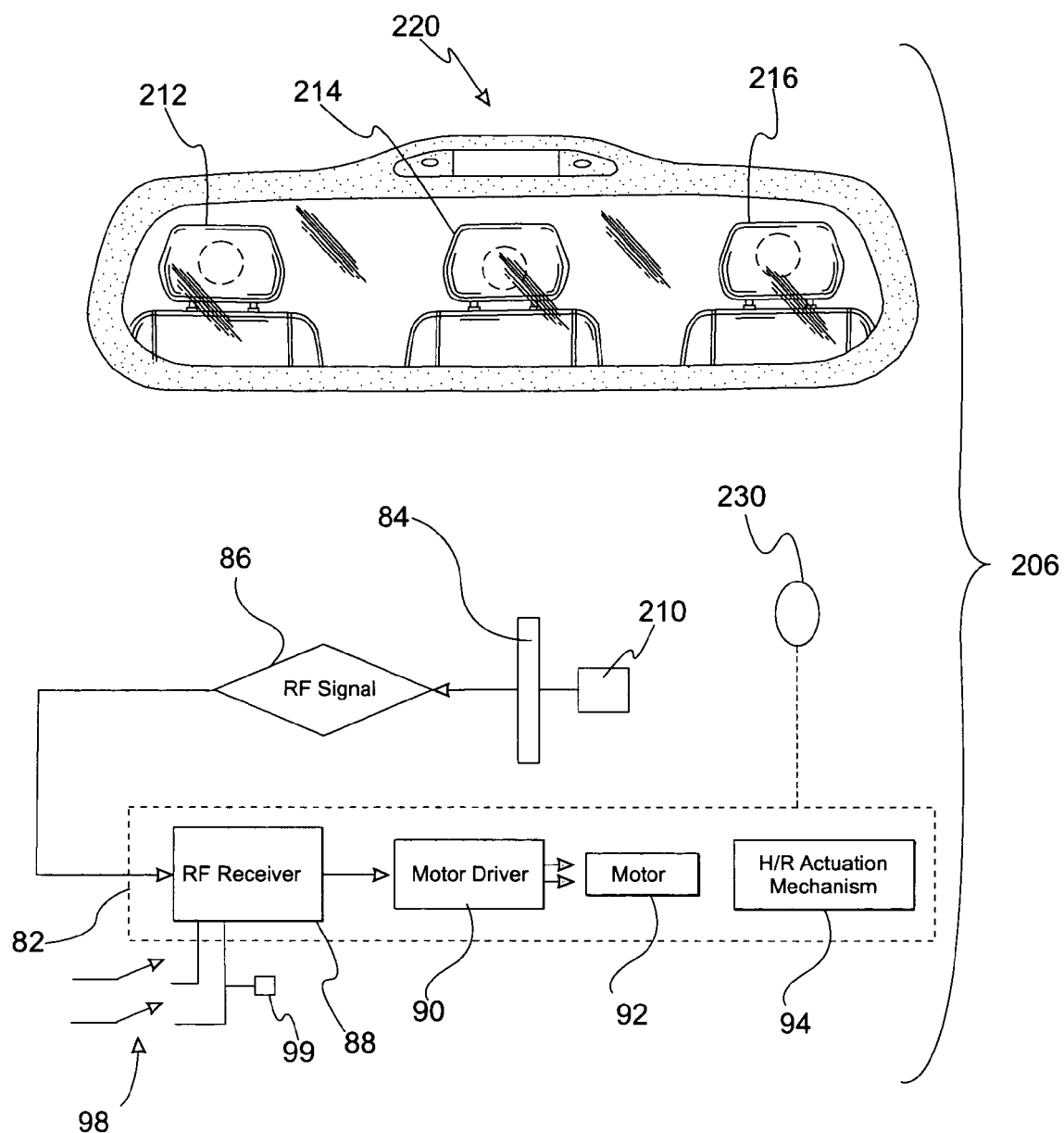
FIG. 9 is a schematic illustration showing the placement of a sensor or switch at various locations in a vehicle interior.

FIG. 9 provides a schematic illustration in which the sensors and or sensor assemblies set forth above are positioned at positions that are not adjacent to the mirror surface. Such positions for placement of the sensor and sensor assemblies include, but are not limited to, the dashboard, the overhead console, armrest, the steering wheel, the peripheral rim of the rearview mirror, and the like. Remote mirror actuation system 206 includes first sensor assembly 210 positioned at such a position. Moreover, first sensor assembly 210 is also configured to output signals to first actuator arrangement 82 to facilitate movement of the first head restraint from its raised position to its lowered position when object 78 comes within a predetermined distance of the first target area. Advantageously, a wireless transmitter is utilized to direct output signals to first actuator arrangement 82. In a variation of the present embodiment, the user is able to activate first sensor assembly 210 while viewing seat images 212, 214, 216 in mirror 220.

First sensor assembly 210 may include the sensors set forth above for sensor 52 or the infrared proximity sensors set forth above. In another variation, first sensor assembly 210 includes radio frequency transmitter 84 which sends RF signal 86 to RF receiver 88 located in first actuator arrangement 82. Upon receiving an RF signal that indicates actuation is to proceed, motor driver 90 drives motor 92 which then activates the headrest actuator mechanism 94. Remote actuation system 206 optionally includes toggle switch 96 that reverses actuated movement of the first head restraint such that when object 78 comes within a predetermined distance of the first target area such that the headrest is moved from the lowered to the upright position when actuation occurs. In further refinement, object 78 must be present in the first target area for a predetermined time period (e.g., at least 3 seconds) before actuation proceeds. This temporal requirement helps to minimize accidental actuation due to inadvertent contact with the first target area. In a variation as set forth above, first infrared sensor assembly 74 is disposed proximate to rearview mirror 72 such that a user can simultaneously view the first head restraint in the mirror and the first area. Alternatively, remote actuation system 206 further comprises a sensor that disables movement of the first head restraint when a user adjusts the rearview mirror. It is also advantageous that remote actuation system 206 be disabled when an occupant is in a seat. Therefore, remote actuation system 206 optionally includes vehicle seat occupant sensor 98 that senses the presence of an occupant in a first seat that includes the first head restraint so that the first head restraint is not movable from the raised to the lowered positions. In yet another refinement, optionally, system 206 includes a user feedback device that provides an indication that the user is about to actuate movement of a headrest (i.e., acknowledgment that the finger is present). A short delay may be provided by the feedback device allowing the user to decide if they still want to actuate the feature, followed by a confirmation feedback indicating that the user has activated the feature. Advantageously, a short tone or beep or the turning on of a light or a vibration can be used for this purpose. In yet another refinement, if two or more sensors are simultaneously touched the function of the sensors is disabled.

Still referring to FIG. 9, remote actuation system 206 includes one or more indicators 230 that provide feedback to the user indicating which headrest is being moved from raised to lowered positions. Examples of suitable types of indicators for one or more indicators 230 include a component selected from the group consisting of light crystal displays mounted on mirror 220 proximate to the image of the headrest being moved, a light source mounted on the mirror 220 proximate to the image of the head restraint being moved, a light source mounted on the mirror 206 such that at least a portion of the image of the head restraint being moved is illuminated, a light source integrated into the head restraints being moved, a sound source integrated into the head restraint being moved, a sound source capable of providing verbal indication of which seat is being moved, a mechanical indicator such as a flap, and combinations thereof.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for remote actuation of at least one vehicle head restraint movable from a respective raised position to a respective lowered position, the system comprising:
   a first head restraint;
   a first actuator arrangement configured to effect movement of the first head restraint from its raised position to its lowered position; and
   a first infrared sensor assembly having an infrared emitter and an infrared detector, the first infrared sensor assembly defining a first target area mapped to the location of an image of the first head restraint in a rearview mirror such that output signals are sent to the first actuator arrangement to facilitate movement of the first head restraint from its raised position to its lowered position when an object comes within a predetermined distance of the first target area.

2. The system of claim 1 wherein the object must be within the first target area for a predetermined period of time before movement of the headrest is actuated.

3. The system of claim 1 wherein the first infrared sensor assembly is disposed proximate to a rearview mirror such that a user can simultaneously view the first head restraint in the mirror and the first area.

4. The system of claim 1 wherein the first infrared sensor assembly defines at least one additional target area.

5. The system of claim 1 further comprising a switch that disables movement of the first head restraint when a user is adjusting the rearview mirror.

6. The system of claim 1 further comprising a vehicle seat occupant sensor that senses the presence of an occupant in a first seat that includes the first head restraint so that the first head restraint is not movable from the raised to the lowered positions.

7. The system of claim 6 further comprising an occupant sensor disabling switch.

8. The system claim 1 further comprising a component that configures the system for wireless communication with the first actuator arrangement.

9. The system of claim 8 wherein the wireless communication utilizes a radio frequency signal.

10. The system of claim 1 further comprising:
    at least one additional head restraint; and
    at least one additional actuator arrangement configured to effect movement of a respective head restraint from its raised position to its lowered position.

11. The system of claim 10 wherein the first infrared sensor assembly defines at least one additional target area and is configured to output signals to the additional actuator arrangement, to independently facilitate movement of the additional head restraint from its respective raised position to its lowered position when an object comes within a predetermined distance of the additional target area.

12. The system of claim 10 further comprising:
    at least one additional infrared sensor assembly configured to be independently actuated by the user, the additional infrared sensor assembly comprising an infrared emitter and an infrared detector and defining an additional target area.

13. A system for remote actuation of at least one vehicle head restraint movable from a respective raised position to a respective lowered position, the vehicle including a rearview mirror, the system comprising:
    a first head restraint;

a first actuator arrangement configured to effect movement of the first head restraint from its raised position to its lowered position; and a first infrared sensor defining a first area mapped to the location of an image of the first head restraint in the mirror and configured to output signals to the first actuator arrangement to facilitate movement of the first head restraint from its raised position to its lowered position when an object comes within a predetermined distance of the first area, the first sensor being disposed such that a user can simultaneously view the first head restraint in the mirror while activating the first sensor.

14. The system of claim 13 wherein the first sensor is disposed proximate to the mirror such that a user can simultaneously view the first head restraint in the mirror and the first area.

15. The system of claim 13 wherein the first sensor is operable to move the first head restraint if the object is within the predetermined distance for a first predetermined period of time.

16. The system of claim 13, further comprising:
at least one additional head restraint;
at least one additional actuator arrangement configured to independently effect movement of the additional head restraint from a raised position to a lowered position; and
at least one additional sensor, the additional sensor defining an additional area and configured to output signals to the additional actuator arrangement and to facilitate movement of the additional head restraint from its raised position to its lowered position when an object comes within a predetermined distance of the additional area, the additional sensor being disposed proximate the mirror such that the user can simultaneously view the the additional head restraint in the mirror and the additional area.

17. The system of claim 16 further comprising an indicator to indicate which head restraint is being moved from raised to lowered positions.

* * * * *